(12) United States Patent
Oomori

(10) Patent No.: US 7,073,958 B2
(45) Date of Patent: Jul. 11, 2006

(54) OPTICAL MODULE

(75) Inventor: Hirotaka Oomori, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 241 days.

(21) Appl. No.: 10/717,909

(22) Filed: Nov. 21, 2003

(65) Prior Publication Data
US 2004/0141755 A1 Jul. 22, 2004

(30) Foreign Application Priority Data
Nov. 21, 2002 (JP) .............................. 2002-338410

(51) Int. Cl.
*G02B 6/42* (2006.01)
(52) U.S. Cl. .......................... 385/92; 257/99
(58) Field of Classification Search ...................... None
See application file for complete search history.

(56) References Cited

U.S. PATENT DOCUMENTS

| | | | |
|---|---|---|---|
| 5,117,476 A * | 5/1992 | Yingst et al. ................. | 385/88 |
| 5,140,384 A * | 8/1992 | Tanaka ......................... | 257/36 |
| 5,814,871 A * | 9/1998 | Furukawa et al. ........... | 257/433 |
| 5,845,982 A * | 12/1998 | Shih ............................. | 353/42 |
| 6,410,904 B1 * | 6/2002 | Ito et al. ................... | 250/214 R |
| 6,540,412 B1 * | 4/2003 | Yonemura et al. ............ | 385/88 |
| 6,587,491 B1 * | 7/2003 | Yamamoto ............... | 372/43.01 |
| 6,703,561 B1 * | 3/2004 | Rosenberg et al. ........ | 174/52.5 |
| 2004/0037334 A1 * | 2/2004 | Funada et al. ................ | 372/43 |
| 2004/0188698 A1 * | 9/2004 | Ishimura ...................... | 257/99 |
| 2004/0208211 A1 * | 10/2004 | Maruyama et al. ........ | 372/38.1 |
| 2005/0018994 A1 * | 1/2005 | Riaziat et al. .............. | 385/147 |

FOREIGN PATENT DOCUMENTS

JP P2001-296458 A 10/2001

* cited by examiner

*Primary Examiner*—Sung Pak
*Assistant Examiner*—Mike Stahl
(74) *Attorney, Agent, or Firm*—McDermott Will & Emery LLP

(57) ABSTRACT

The present invention provides an optical module with effective thermal dissipation characteristic. The present optical module comprises a semiconductor optical device, a stem, plural lead terminals, a substrate and a base. The stem mounts the semiconductor optical device. The lead terminals extend along a predetermined axis from the stem. The base mounts the substrate on which an electronic circuit is provided. The edge portion of the base adjacent to the stem is made of a material containing the same ingredient as that contained in the stem, or the stem and the base are formed in unity.

15 Claims, 5 Drawing Sheets

OPTICAL MODULE

BACKGROUND OF THE INVENTION

1. Field of Invention

This invention relates to an optical module and an optical network using the same.

2. Related Prior Art

A semiconductor laser with a can-type package is widely applied in an optical communication system. Such can-type package 82, as shown in FIG. 5, is connected to a substrate 86 via lead terminals 84 and constitutes a light-emitting module 80. The light-emitting module thus formed is installed into a chassis and forms an optical transmitting module disclosed in the Japanese patent laid open 2001-296458. In this patent, an optical transceiver is also disclosed, in which not only the optical-transmitting module but also an optical-receiving module are provided in the chassis.

In the present and future optical communication system, further speed and capacity must be requested and accordingly thermally stable operation will be required to the optical-module used in such high-speed and high-capacity optical system. To realize the stable operation in the optical module, heat generated in the can-type package and generated by electrical components mounted on the substrate must be effectively dissipated outside the package. Therefore, an object of the present invention is to provide an optical module with superior thermal dissipation characteristic and an optical communication system using such optical modules.

SUMMARY OF THE INVENTION

According to one aspect of the present invention, an optical module comprises a semiconductor optical device, a stem, a plurality of lead terminals, a substrate and a base. The stem mounts the semiconductor optical device. The plurality of lead terminals extends along a predetermined axis from the stem. The base mounts the substrate on which an electronic circuit is provided. The electronic circuit is electrically connected to the semiconductor optical device via lead terminals.

Since the optical module thus configured provides the base extending along the predetermined axis from the stem and the substrate is mounted on the base, heat generated by the semiconductor optical device is transmitted to the base via the stem and heat generated by electronic components constituting the electronic circuit and mounted on the substrate is directly transmitted to the base, thereby facilitating heat dissipation.

In the present optical module, the stem may be made of a first material, and the base may be made of a second material. Conventional module has a stem made of CuW, which is comparatively costly material. Since the present invention has the base made of different material to the stem, the base may be made of relatively economical material, such as aluminum, thereby reducing the cost of the module without fang the effective heat dissipation.

In the optical module, an edge portion of the base may contain the same material as that constituting the stem. When the stem and the base are made of different material, a thermal stress between the lead terminals and the substrate, which originates in different thermal expansion co-efficient of respective materials, may bring an electrical defect therebetween. By containing the same material as the stem in a edge portion of the base, a stress induced between the lead terminals and the substrate may relax, thereby enhancing the reliability of the module.

The ingredient of the first material to the second material at the edge portion may gradually decrease from the stem to the portion apart therefrom. This configuration further relaxes the discrepant thermal expansion co-efficient.

Sintering preferably forms the base, which is most suitable technique to form the edge portion of the base because the ingredient thereof is varied continuously.

The stem and the base are preferably made of the same material and are formed in unity. This enhances the thermal dissipation characteristic without taking the thermal expansion co-efficient into account.

The lead terminals and the base preferably sandwich the substrate therebetween, which facilitates the positioning of the substrate and effects the manufacturing.

DETAILED DESCRIPTION OF PREFERRED EMBODIMENTS

Preferred embodiments of the present invention will be described as referring to accompany drawings. In the description of drawings, elements identical to each other will be referred to with numerals identical to each other without overlapping explanations.

Figure 1:
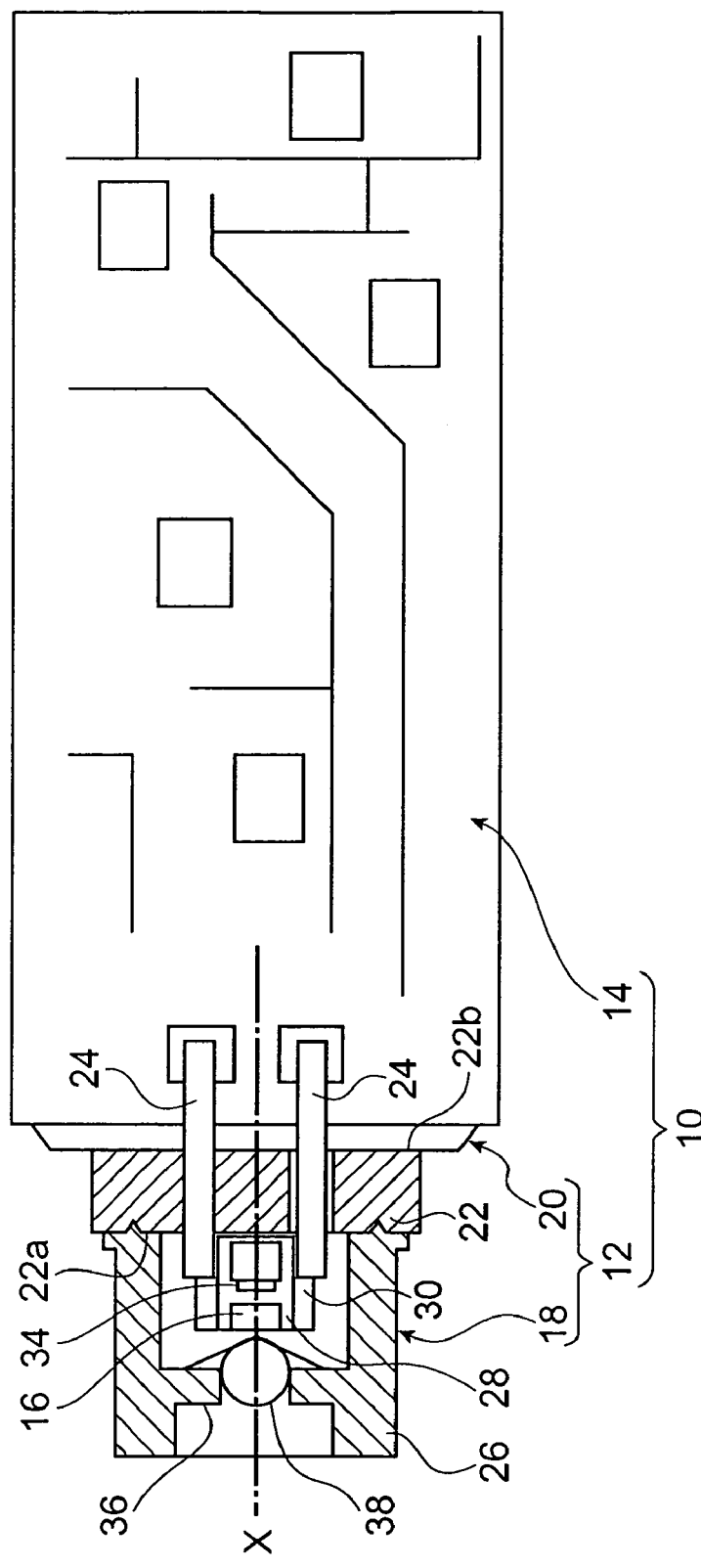
FIG. 1 is a plan view showing an embodiment of the present invention.
Figure 2:
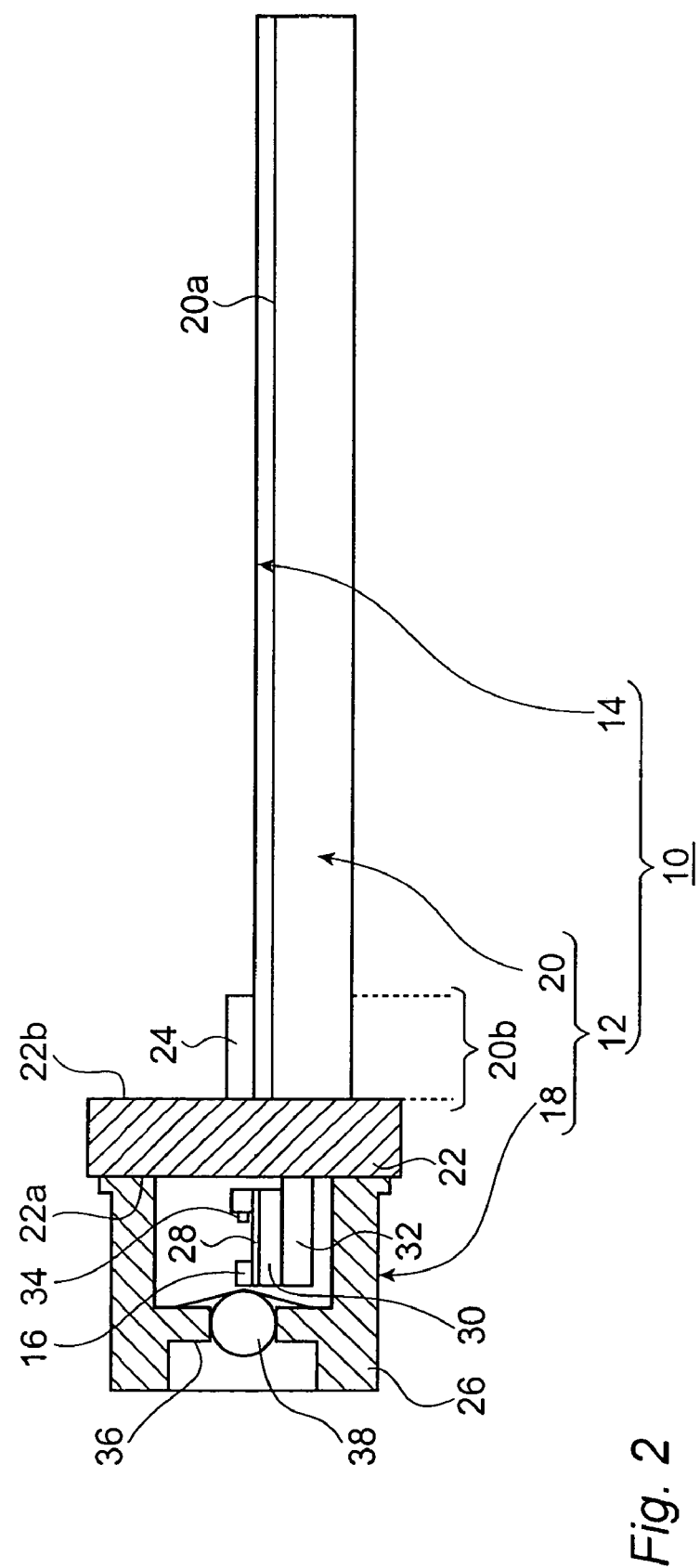
FIG. 2 is a side view of the embodiment.

FIG. 1 is a plan view of a light-emitting module 10 according to the present embodiment and FIG. 2 is a side view of the light-emitting module 10. In FIGS. 1 and 2, a package 12 of the light-emitting module is partially cross-sectional view to show the inside configuration.

As shown in FIG. 1 and FIG. 2, the light-emitting module 10 comprises a package 12 and a substrate 14. The package 12 has a primary portion 18 for enclosing a semiconductor laser 16 and a base 20 for mounting the substrate 14.

The primary 18 includes a stem 22, the semiconductor laser 16, a plurality of lead terminals 24 and a casing 26 of a can type. The stem 22 is made of a metal such as CuW, Kovar and iron, and has a shape of a disk. The stem 22 has a primary surface 22a, where the semiconductor laser 16 is mounted via a sub-mount 32, and another surface 22b opposite to the primary surface 22a. The stem 22 is arranged such that the primary surface 22a intersects an optical axis with a right angle.

The semiconductor laser 16 is a type of Fabry-Perot (FP) laser diode and/or a type of distributed feedback (DFB) laser diode. The semiconductor laser 16 is mounted on the primary surface 22a of the stem. Namely, as shown in FIG. 2, the laser diode 16 is mounted on a sub-mount 28 made of a material with high thermal conductivity such as aluminum nitride (AlN), and the sub-mount 28 is disposed on the Peltier element 30. Further, The Peltier element 30 is disposed on a heat sink 32, which is made of a material with a high thermal conductivity such as CuW, and the heat sink 32 is mounted on the primary surface 22a of the stem 22. In one side of the semiconductor laser opposite to a direction to which the light is emitted, a light-receiving device 34 is disposed to monitor the operation of the semiconductor laser 16.

The plurality of lead terminals 24 pierce the stem 22 and extends along the optical axis X. One of the lead terminals electrically connects to the semiconductor laser 16 via a bonding-wire, which is not shown in drawings. Another lead terminal is connected to the light-receiving device 34.

The casing 26 has a cylindrical shape. Inner surface of the casing 26 has a disk shaped projection 36 with an opening in the center thereof. Within the opening, a spherical lens 38 is secured. The casing 26 covers the primary surface 22a of the stem 22, thereby enclosing the semiconductor laser 16, the light-receiving device 34, the sub-mount 28, the Peltier element 30 and the head sink 32 therein.

Thus, the primary portion 18 of the package 12 is constituted, which forms a can-package similar to a conventional package. However, the package according to the present invention further includes the base 20 for mounting the substrate 14. The base 20 may be formed independent to the stem 22 and may be assembled mechanically later, or may be integrally formed with the stem 22 from the thermal characteristic viewpoint.

Figure 3:
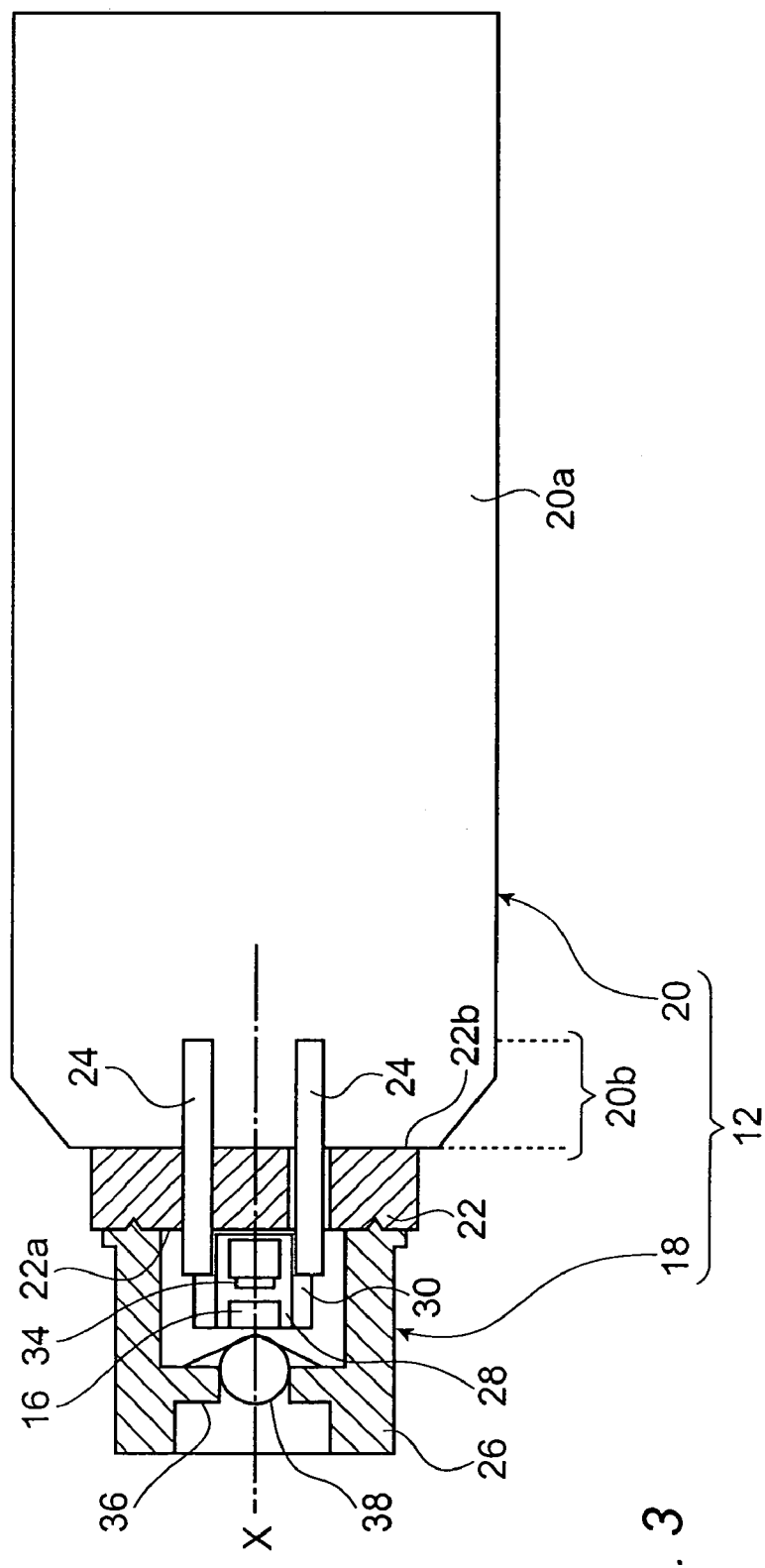
FIG. 3 shows a structure of the package with removing the substrate.

FIG. 3 shows the package 12 as the substrate 14 is removed from the base 20. As shown in FIG. 3, the base 20 extends continuously from the surface 22b of the stem 22 along the optical axis X. The base has a shape of substantially rectangle sheet and has a surface 20a for securing the substrate 14 thereon.

The substrate 14 is made of ceramics, on which an electronic circuit is formed for driving the semiconductor laser 16. The substrate 14 is mounted on the surface 20a of the base and connected to lead terminals 24.

The base 20 of the package 12 is made of metal such as aluminum or copper, which is different metal of the stem 22. The edge portion 20b of the base 20 may contain same materials, for example CuW, which is included in the stem 22. Further, the content of such material in the edge portion 20b gradually preferably decreases as the position is apart from the stem 22 along the optical axis X. Where, the gradual decrease includes not only continuous decreasing but also stairs-like decreasing.

Such edge portion 20b of the stem may be formed by the sintering, namely, metals in powder form are shaped to a predetermined form and hot-pressed. The sintering is not necessary for melting and casting of source metals. Therefore, the sintering is suitable to form the edge portion 20b of the base 20. A length of the edge portion is preferably between from 10% to 20% of the total length of the base 20 measured along the optical axis X. Moreover, the substrate 14 of the present embodiment is preferably sandwiched between lead terminals 24 and the base 20.

Next, a function and a way of the present light-emitting module will be described hereinbelow.

The light-emitting module 10 has the base 20 that extends along the optical axis X from the surface 22b of the stem 22. The substrate 14 is mounted on the surface 20a of the base 20. Therefore, heat generated by the semiconductor laser 16, and by the electronic part when the driving circuit is involved in the package, is transmitted to the base 20 via the stem 22. The heat generated by electronic parts mounted on the substrate 14 is directly transmitted to the base 20. Thus, the heat can be transmitted through wide area of the base 20, which enhances efficiency of the heat dissipation of the module 10. Thicker stem 22 along the optical axis X also enhances the heat dissipation from the package 12 because the surface area of the package increases. In this case, care must be paid so as not to enlarge the size of the module 10. The present light-emitting module 10 has the base 20 extending along the substrate 14, which does not bring the enlargement of the module 10.

Generally, the stem 22 of the conventional module is made by comparably costly material such as CuW. However in the present embodiment, since the base 20 is made of comparably low-priced metal such as aluminum, the heat dissipation and the low cost can be compatible.

As described previously, the edge portion 20b of the base 20 may contain same materials as the stem 22 contains, for example when the stem 22 is made of CuW and the base 20 is made of aluminum, the edge portion 20b is made of an alloy of CuW and aluminum. This configuration relaxes the difference in thermal expansion coefficient of respective materials, thereby decreasing the inferior electrical contact between the lead terminals and the wiring on the substrate.

Further, since the present light-emitting module 10 has the configuration that the base 20 is fixed mechanically and electrically to the stem 22, a stray inductance can be reduced, thereby stabilizing the ground line.

Although descriptions above are solely concentrated to the light-emitting module 10, the concept and the spirit of the present invention can be applied to a light-receiving module which comprises a semiconductor light-receiving device such as photo diode instead of the semiconductor laser. In such light-receiving module, heat generated by the light-receiving device and, by a pre-amplifier if the module contains therein, can be transmitted to the base 20 via the stem 22. The heat generated by electrical components mounted on substrate 14 transmits to the base 20, thereby facilitating the heat dissipation through a wider area compared to a conventional module. In the light-receiving module, the light-receiving device 34 for monitoring the optical output from the light-emitting device is not necessary.

These light-emitting module and light-receiving module described above are installed in a chassis, not shown in drawings, and constitutes an optical-transmitting module or optical-receiving module, respectively, or both the light-emitting module and the light-receiving module are installed in a chassis and constitute an optical transceiver.

The optical network 50 includes a plural optical-transmitting module 52, an optical multiplexer 56, an optical transmission line 56, an optical amplifier 58, an optical de-multiplexer 60 and a plural optical-receiving module 62. Each optical-transmitting modules 52 and optical-receiving modules 62 include the light-emitting module or the light-receiving module of the present invention. The optical multiplexer 56 multiplexes optical signals with respective wavelengths output from optical-transmitting modules 52. The optical de-multiplexer 60 divides optical signals transmitted through the optical transmission line 56 into optical signals with respective specific wavelength output to optical-receiving modules 62. Since the light-emitting module or the light-receiving module of the present invention has a superior thermal dissipation configuration, the optical network shown in FIG. 4 develops a thermal stability even in a high-speed and a high-capacity transmission.

From the invention thus described, it will be obvious that the invention may be varied in many ways. For example, the light-emitting module 10 or the light-receiving module has the configuration that the stem 22 and the base 20 are formed independently and the mechanically secured to each other. However, the both members 20 and 22 may be formed in unity. In such configuration, the thermal dissipation efficiency can be enhanced without taking the difference of the thermal coefficient of both members into account. The manufacturing of such unified member can be also simplified.

Figure 4:
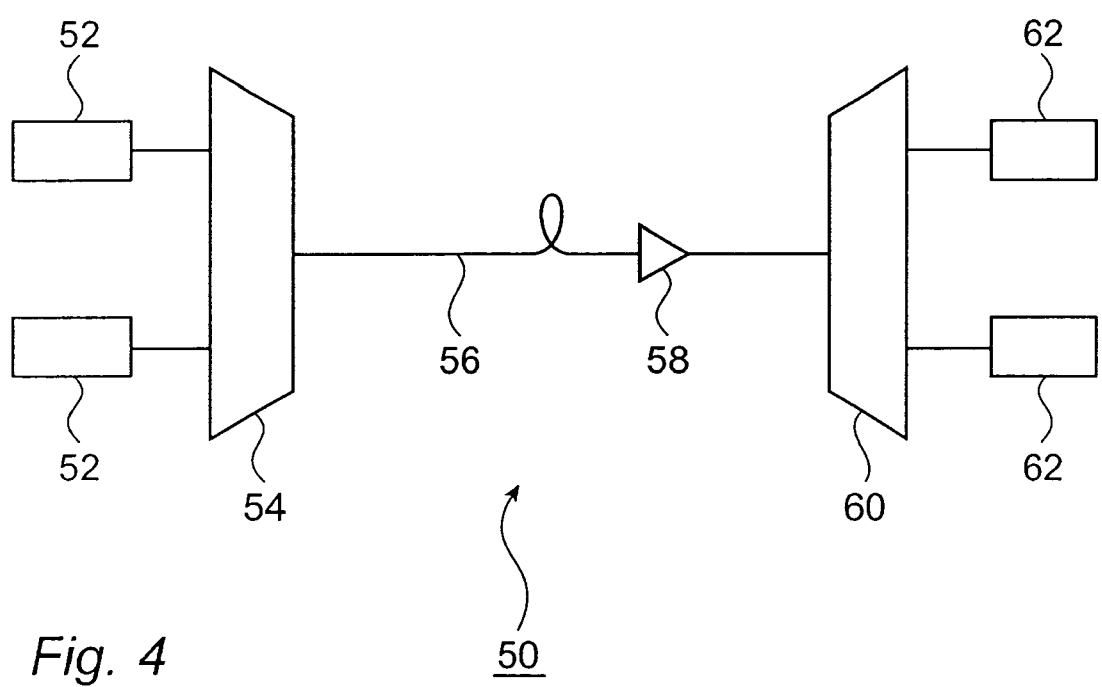
FIG. 4 shows a configuration of the optical network.
Figure 5:
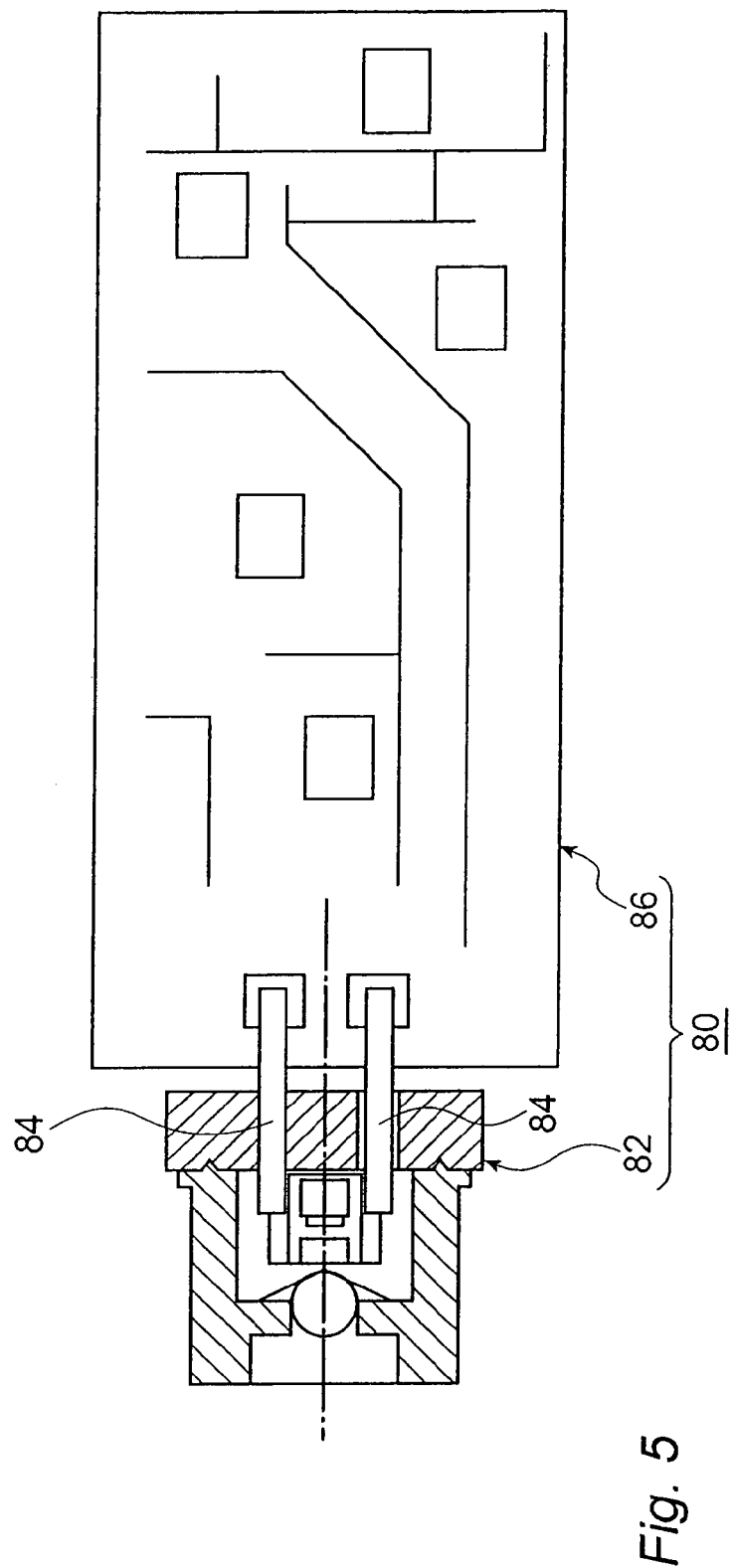
FIG. 5 is a plan view showing the conventional light-emitting module.

Further, although a "point to point" configuration for the optical network is shown in FIG. 4, the network does not restricted to such configuration. For example, the present invention is applicable to a network with a ring configuration or a mesh configuration without any modification of the invention.

What is claimed is:

1. An optical module, comprising:
   a semiconductor optical device;
   a stem made of a first material for providing the semiconductor optical device;
   a plurality of lead terminals extending along a predetermined axis from the stem, the lead terminals transmitting signals between the semiconductor optical device and an electronic circuit;
   a substrate for providing the electronic circuit thereon; and
   a base made of a second material different from the first material for mounting the substrate, the base being in direct contact with the stem,
   wherein the base extends along the predetermined axis from the stem and the lead terminals are electrically and directly connected to the electronic circuit provided on the substrate.

2. The optical module according to claim 1, wherein the base has an edge portion in direct contact with the stem, and the edge portion contains the first material.

3. The optical module according to claim 2, wherein a content of the first material in the edge portion gradually decreases from the stem to a position apart from the stem.

4. The optical module according to claim 2, wherein at least edge portion is formed by the sintering.

5. The optical module according to claim 1, wherein the semiconductor optical device is a semiconductor laser diode.

6. The optical module according to claim 1, wherein the semiconductor optical device is a photo diode.

7. The optical module according to claim 1, wherein the semiconductor optical device is a semiconductor laser diode and a photo diode, the optical module constituting an optical transceiver.

8. A light-emitting module, comprising:
   a light-emitting device;
   a substrate for installing an electronic circuit; and
   a package including a primary portion and a base, the primary portion having a stem made of first material, a casing, and a plurality of lead terminals extending from the stem to connect the light-emitting device in electrical contact with the electronic circuit on the substrate, the stem installing the light-emitting device thereon, the casing enclosing the light-emitting device therein co-operating with the stem, and the base installing the substrate thereon,
   wherein the base is made of second material and is in direct contact with the stem.

9. The light-emitting module according to claim 8, wherein the primary portion forms a can-package with the casing having a cylindrical shape.

10. The light-emitting module according to claim 8, wherein the base has an edge portion in contact with the stem, the edge portion containing the first material.

11. The light-emitting module according to claim 10, wherein a content of the first material in the edge portion gradually decreases from the stem to a position apart from the stem.

12. The light-emitting module according to claim 10, wherein the base is formed by the sintering.

13. The light-emitting module according to claim 8, wherein the first material is CuW.

14. The light-emitting module according to claim 8, wherein the second material is aluminum (Al).

15. The light-emitting module according to claim 8, wherein the second material is copper (Cu).

* * * * *